United States Patent [19]

Wilson

[11] 3,917,801

[45] Nov. 4, 1975

[54] FLOTATION OF BORIC ACID FROM SODIUM SULFATE OBTAINED DURING THE PROCESSING OF BORATE ORES

[75] Inventor: Martin Wilson, Anaheim, Calif.

[73] Assignee: United States Borax & Chemical Corporation, Los Angeles, Calif.

[22] Filed: Jan. 3, 1974

[21] Appl. No.: 430,594

[52] U.S. Cl. .................. 423/283; 23/298; 75/2; 209/167
[51] Int. Cl.² ........................................... C01B 35/10
[58] Field of Search ........... 423/283; 75/2; 209/166, 209/167; 23/298, 299, 309, 312

[56] References Cited
UNITED STATES PATENTS

| | | | |
|---|---|---|---|
| 1,446,375 | 2/1923 | Borcherdt | 209/167 |
| 2,205,923 | 6/1940 | Doerner et al. | 209/167 |
| 3,111,383 | 11/1963 | Garrett et al. | 423/283 |

OTHER PUBLICATIONS

Kneckerbocker, Beneficiation of Boron Minerals, in Bureau of Mines, R.I. 3525, June 1940.

Chemical Materials Catalog, New York, 1967 p. v20–27 (antifoams).

*Primary Examiner*—Walter R. Satterfield
*Attorney, Agent, or Firm*—James R. Thornton

[57] ABSTRACT

Clean crystalline boric acid is isolated from a slurry, obtained by reaction between a borate ore and sulfuric acid, and seriously contaminated with clay slimes and sodium sulfate, by the steps of adding a crystal modifier to the slurry, stirring said slurry at a temperature from about 55° to about 100°C., cooling said slurry to a temperature near Glauber's salt transition temperature, adding a froth modifier to said slurry cooled to a temperature near Glauber's salt transition temperature, subjecting said cooled slurry to a froth flotation manipulation, and separating the tailings of the froth flotation manipulation from floated materials consisting essentially of clean crystalline boric acid.

21 Claims, No Drawings

FLOTATION OF BORIC ACID FROM SODIUM SULFATE OBTAINED DURING THE PROCESSING OF BORATE ORES

SUMMARY OF THE INVENTION

The object of this invention is to provide a process for the isolation of clean crystalline boric acid from a slurry obtained by treating a borate ore with sulfuric acid. The slurry thus obtained is seriously contaminated with clay slimes and sodium sulfate, which is the by-product of the reaction between a borate ore, e.g., a sodium tetraborate, and sulfuric acid as represented by the equation:

$$Na_2B_4O_7 \cdot xH_2O + 5H_2O + H_2SO_4 \rightarrow Na_2SO_4 + 4H_3BO_3 + xH_2O.$$

The process of this invention requires the addition of a first surfactant, that is, a crystal modifier, to a slurry of sodium sulfate, boric acid and clay slimes obtained by treating a borate ore with sulfuric acid. The slurry is stirred in the temperature range from about 55°C. to about 100°C. and then cooled to a temperature above the Glauber's salt transition temperature of 29.2°C.

A second surfactant, that is, a froth modifier, is added to the cooled slurry, which is treated by a standard froth flotation process to yield floated materials consisting essentially of clean crystalline boric acid and tailings containing sodium sulfate.

The method of this invention produces recoveries of floated boric acid of up to about 97%, and the boric acid purity often reaches the 99% level.

BACKGROUND OF THE INVENTION

Previously reported methods for the flotation of boric acid from aqueous solutions or slurries of various inorganic salts have generally proved to be unsatisfactory for commercial exploitation.

Andreyeva et al teach, in "Zhurnal Prikladnoi Khimii," Vol. 10, No. 5, at 845–852 (1937), that boric acid can be floated from Glauber's salt solution. However, flocculation was said to present a serious problem, as did the entrainment of air bubbles in the boric acid aggregate. Andreyeva et al. achieved only separation of about 90% purity boric acid at about 90% recovery.

The flotation of boric acid from a clarified $MgSO_4 \cdot 7H_2O$ solution, produced from inderite ore, was also reported by D. F. Rize et al, The Soviet Chemical Industry, No. 1, January 1971. Although 90% recovery of 98% pure boric acid was claimed, this was achieved only after three cleanings and clarification of the hot liquors prior to cooling. Consequently, the settled slimes retained a considerable amount of hot, adhering brine, high in dissolved boric acid.

The flotation of boric acid from colemanite treated with sulfur dioxide has been reported by Knickerbocker, "Beneficiation of Boron Minerals," Bureau of Mines, U.S. Department of the Interior, R.I. 3525 (June 1940). Knickerbocker reported 90% recovery and a product of 90% purity, but recited that the boric acid floated so readily that two or more cleanings were required.

It is thus apparent that the process of this invention is significantly superior to hitherto know processes. It is also significant that the process of this invention separates, preferably, the boric acid from anhydrous sodium sulfate above the Glauber's salt transition point of 29.2°C.

DETAILS OF THE INVENTION

Borate ores which are suitable for the practice of this invention include borax (tincal), kernite, ulexite, colemanite, inderite, and the like. Borax and kernite are hydrated sodium tetraborates having 10 and 4 molecules of water of hydration, respectively. Ulexite is a natural hydrated borate ore of soduim and calcium, $NaCaB_5O_9 \cdot 8H_2O$. Colemanite is a natural hydrated calcium borate, $Ca_2B_6O_{11} \cdot 5H_2O$.

The process of this invention is also useful for recovering boric acid from Glauber's salt slurries obtained from the cooling of mother liquors obtained after the reaction of refined borax with sulfuric acid and filtration of the crude boric acid above the Glauber's salt transition point. Use of this procedure permits the recovery of boric acid which would otherwise be lost and thus results in increasing the overall efficiency of the extraction of boric acid from borate ores.

Of the several sources of boric acid enumerated above, kernite and Glauber's salt slurries containing boric acid are especially preferred for the purposes of this invention.

Although it is known that boric acid in an aqueous slurry thereof tends to float, boric acid in a brine saturated with sodium sulfate also tends to flocculate. Thus, there is obtained an extremely voluminous unbreakable froth having the consistency of whipped cream. As a result, the boric acid concentrates obtained are seriously contaminated with foreign matter. Although it is possible to obviate this problem by using a low solids slurry, of the order of 5% of solids, the use of two surfactants in combination as taught in this invention permits dispersion of flocculated boric acid in slurries containing up to about 40% by weight of solids and the production of a dense, brittle boric acid froth during the flotation step. Slurries containing from about 10% of solids to about 40% of solids have been treated successfully by the method of this invention.

In the practice of this invention, the surfactants selected are critical factors in the successful operation of the process. During the reaction of the refined borax or the boron minerals with the sulfuric acid at elevated temperatures, all boric acid is in solution. During the cooling process, the boric acid crystallizes. Without a crystal modifier, the boric acid tends to form crystal agregates, occluding solid foreign matter which happens to be present. But when a crystal modifier or first surfactant is present, the boric acid tends to form single crystals free of unwanted material.

The preferred crystal modifier surfactants are anionic. Those surfactants which are particularly preferred include the salts of sulfated polyethyleneoxy derivatives of linear aliphatic alcohols, sodium hydrocarbon sulfonates, polynaphthalene sulfonic acids, and salts of polymeric aliphatic carboxylic acids as exemplified by Hyonics JN 400 and Sulfotex SAT, Alkanol 189-S, Blancol N, and Tamol 850, respectively. Combinations of crystal modifier surfactants can also be used.

Although the acidic slurry to which the crystal modifier is added may be stirred at a temperature from about 55° to about 100°C., the preferred range is between about 70° and about 90°C. When the borate ore is kernite, this stirring operation is commonly done at about 70°C.

The crystal modifier may be added to a contaminated slurry at any point up to addition of the froth modifier preparatory to the froth flotation step, but is preferably added to the reaction slurry during acidification of the ore.

The amount of the first surfactant used is of the order of 0.1 to about 5.0 pounds per ton of feed ore. Preferably about 0.25 to about 2.5 pounds per ton is added.

In one embodiment of this invention, the slurry is cooled to a temperature above Glauber's salt transition temperature of 29.2°C. in order to prevent the crystallization of Glauber's salt from the brine. When the borate ore is kernite, the slurry is generally cooled to a temperature of about 30° to 50°C., preferably about 35° to 40°C. The slurry is then subjected to a froth flotation manipulation, following addition of a second surfactant.

The second surfactant or froth modifier mainly controls the froth during the flotation. Overfrothing is avoided and froth characteristics change from a creamy appearance to a brittle consistency. The froth breaks down once carried out of the cell. These froth modifiers are selected according to the system in which they are used. In the absence of clay slimes, alkyl polyethyleneoxy sulfate salts, such as Sulfotex SAT and Hyonics JN 400, and aliphatic acid phosphate esters, such as Gafac RS 710, are preferred froth modifiers in amounts of about 0.1 to 0.75 pound per ton of slurry. As will be apparent, the alkyl polyethyleneoxy sulfates combine the properties of the crystal modifier for boric acid and the froth modifier and can, therefore, be added in the right amount to the reactor for both purposes and to avoid the use of two surfactants.

When clay slimes are present, the above froth modifiers are absorbed on the clay and rendered ineffective. In such a case, crystal modifiers represented by the polycarboxylates and polynapthalene sulfonates are added before the reaction of the boron mineral with sulfuric acid. Froth modifiers such as Gaftex 328, Dow Corning Antifoam B, anionic silicone emulsions and nonionic hydrophobic silica antifoaming agents are suitable.

Addition of a frother to the flotation cells will sometimes increase recovery by preventing the tendency of the froth to die out at the end of flotation. Dowfroth 250, a polyethylene glycol, was most persistent at a level of 0.01 to 0.03 pound per ton of feed.

In another embodiment of this invention, Glauber's salt solution, from which boric acid has been isolated, is cooled below Glauber's salt transition temperature, preferably in the range between about 20° and about 25°C., in order to induce crystallization of Glauber's salt and to form "Glauber's salt slurry." However, some boric acid will crystallize simultaneously with the Glauber's salt. This represents a special case in which Glauber's salt, and not anhydrous sodium sulfate, is present with the boric acid in a solid phase. To recover the boric acid from the Glauber's salt, the Glauber's salt slurry is subjected to a flotation process. No crystal modifier is required, but froth modifiers have a beneficial effect.

The level of the froth modifier will normally be of the order of about 0.01 to about 2.0 pounds per ton of feed, but perferably is present at a level of between 0.02 and 0.75 pound per ton.

As has been pointed out, the flotation efficiency depends on the temperature at which the reaction between the boron mineral and the sulfuric acid takes place, as well as on the selection of the surfactants. However, the pH level of the slurry also plays an important role. For example, the Ph of the flotation slurry at 38°C. should be between 4 and 5, preferably about 4.5. To produce a slurry with a pH of 4.5 at 38°C., the pH at the temperature at which the reaction between the boron mineral and the sulfuric acid should preferably take place (80°C.) should be about 3.3. When cooled to 38°C., this slurry will have a pH of 4.5. If the reaction is carried out below 80°C., the pH level should be correspondingly higher during the reaction so as to obtain the same pH of 4.5 at 38°C.

The pH of the slurry is controlled by the relative amounts of boron minerals and sulfuric acid which are fed into the reactor slurry simultaneously. The pH of a slurry at 80°C. might be maintained at 3.3. However, it is also possible to perform the reaction in two steps. In a first reactor tank, at 80°C., the pH is maintained at a pH level higher than 3.3, such as between 4.2 and 5.0, but preferably 4.5. Subsequently, the pH of the slurry is lowered to 3.3 in the second reactor tank by the addition of sulfuric acid only. This procedure has been proven to be beneficial to the subsequent flotation of boric acid. However, instead of having a two-step reaction, a one-step reaction will give similar flotation results, but only if the amount of the first surfactant added during the reaction is substantially above the normal level of 1–2 pounds per ton of slurry.

Regulation of the crystal sizes of the boric acid and sodium sulfate is also important in order to obtain an efficient flotation separation. Maximum sizes should be promoted. Therefore, turbulence should be avoided during the reaction and cooling. During cooling, some evaporation, which might vary between 3 to 10% of the water in the mother liquor according to the process used, takes place. Some evaporation is beneficial because of the resulting increase in crystal sizes so that the separation of boric acid from sodium sulfate by flotation is facilitated.

The conditions described apply to all boron minerals, whether refined or crude ores, e.g., kernite, colemanite, ulexite, and inderite. However, the ores must be crushed to a suitable particle size. For example, kernite ore (10–40% water insolubles) can be crushed to about −3 mesh (measured by the size of the gangue particles rather than the kernite, which splinters into needles). After the reaction with sulfuric acid at elevated temperatures, into long slurry can be passed over a scalping screen to eliminate the coarse gangue. This avoids additional sliming of the water insolubles and facilitates further processing. This procedure also lessens the problem of separating the solids in the tailings from the mother liquors.

It is also of interest to note that when crystal modifiers are added to the water-insolubles containing slurries, boric acid crystallizes as a white product. Unless crystal modifiers are used, clay slimes in the boric acid crystals give them a dark appearance.

It will be apparent that many changes and modifications may be made in the examples given herein without departing from the spirit and scope of the invention. It will thus be apparent that the examples given below are by way of illustration of the invention and not by way of limitation.

EXAMPLES 1–5

The Separation of Boric Acid from Anhydrous Sodium Sulfate by Flotation: Boric Acid Produced By Reaction Between Refined Borax Pentahydrate And Sulfuric Acid

EXAMPLE 1

A portion of $Na_2SO_4$ — $H_3BO_3$ equilibrium brine (2,390 grams) at 38°C. was heated to 80°C. in a three-liter beaker. A pH electrode and a thermometer were dipped into the hot liquor and gentle agitation was provided. Tamol 850 (a sodium salt of a carboxylate polyelectrolyte) was added at a level of 1.7 pounds per ton of feed to the hot liquor. The reaction was started by feeding borax pentahydrate (291 grams; 1 mole) and concentrated sulfuric acid (98 grams; 1 mole) simultaneously by using a vibrating feeder and a dropping funnel. The pH was maintained between 4.5 and 4.8 by varying the respective feed rates and the temperature was maintained at between 80° and 85°C. After about 20 minutes, all of the borax had been fed into the reactor. It took approximately another 10 minutes to add the remaining sulfuric acid so as to raise the pH from 3.2 to 3.3. At this point all of the boric acid was in solution. The slurry was then allowed to cool to 38°C. (about three hours). The pH was observed to increase to 4.5. Care was taken to cover the beaker during the reaction and cooling periods to avoid excess evaporation, above about 4–5% of the water in the brine.

The cooled slurry was transferred to a flotation cell (Wemco). Hyonics JN 400 (the ammonium ether sulfate of a polyoxyethylene derivative of a primary straight chain alcohol) was added as a froth modifier at a level of 0.15 pound per ton of feed and Dowfroth 250 was added as a frother at a rate of 0.08 pound per ton of feed. Air was allowed to enter the cell, without conditioning. During flotation, equilibrium brine at 38°C. was added to maintain the slurry level in the cell. At the end of the flotation period (about 2.5 minutes) the froth became flat. After settling, the rougher tailings were centrifuged. They are final. The mother liquor was reused to slurry the rougher concentrate which was submitted to a cleaner flotation (about 1.5 minutes) without any further reagent addition. After settling and decantation, the cleaner tailings (middlings) and the cleaner concentrate were centrifuged.

EXAMPLE 2

The procedure followed was the same as that described in Example 1. However, Gafac RS 710 (the free acid of an aliphatic phosphate ester) was used as the froth modifier (0.15 pound per ton of feed) and Tamol 850 was used as the crystal modifier (1.7 pounds per ton of feed). The results are given in Table I.

EXAMPLE 3

The procedure followed was the same as that described in Example 1. However, Gaftex 328 (an anionic silicone emulsion) was used as the froth modifier (0.6 pound per ton of feed) and Tamol 850 was used as the crystal modifier (1.7 pounds per ton of feed). The results are given in Table I.

EXAMPLE 4

The procedure followed was the same as described in Example 1. However, Blancol N (a sodium salt of a naphthalenesulfonic acid-formaldehyde condensate) was used as the crystal modifier (0.85 pound per ton of feed) and Hyonics JN 400 was used as the froth modifier (0.15 pound per ton of feed). The results are given in Table I.

EXAMPLE 5

The procedure followed was the same as described in Example 1. However, Hyonics JN 400 (0.15 pound per ton of feed) was added as the crystal modifier to the slurry at 80°C. prior to the reaction of borax with sulfuric acid. No second surfactant had to be added since Hyonics JN 400 fulfills the dual purpose of crystal modifier and froth modifier. The results are given in Table I.

All products were analyzed wet for boric acid and sodium sulfate and water determined by the difference. The amount of water which was left due to the adhering brine, allowed the calculation of the amounts of boric acid and sodium sulfate contained in the adhering brine. These amounts were deducted from the product analyses. In this way, the analytical figures were brine-corrected and represent the solid phase only. The results are presented in Table I.

TABLE I

| | | | Cleaner Concentrate | | | | Middling | | | Rougher Trailings | | |
| Ex. | Crystal Modifier | Froth Modifier | $H_3BO_3$ % Grade | $H_3BO_3$ % Dist. | $Na_2SO_4$ % Grade | $Na_2SO_4$ % Dist. | $H_3BO_3$ % Grade | $H_3BO_3$ % Dist. | $Na_2SO_4$ % Grade | $Na_2SO_4$ % Dist. | $H_3BO_3$ % Grade | $H_3BO_3$ % Dist. | $Na_2SO_4$ % Grade | $Na_2SO_4$ % Dist. |
|---|---|---|---|---|---|---|---|---|---|---|---|---|---|---|
| 1 | Tamol 850 | Hyonics JN 400 | 99.1 | 98.0 | 0.9 | 1.2 | 47.3 | 1.5 | 52.7 | 2.2 | 0.7 | 0.5 | 99.3 | 96.6 |
| 2 | Tamol 850 | Gafac RS 710 | 99.5 | 98.8 | 0.5 | 0.6 | 26.7 | 0.8 | 73.3 | 2.6 | 0.3 | 0.4 | 99.7 | 96.8 |
| 3 | Tamol 850 | Gaftex 328 | 99.0 | 98.8 | 1.0 | 1.2 | 22.2 | 0.6 | 77.8 | 2.6 | 0.7 | 0.6 | 99.3 | 96.2 |
| 4 | Blancol N | Hyonics JN 400 | 99.5 | 97.9 | 0.5 | 0.7 | 41.0 | 1.5 | 59.0 | 2.9 | 0.8 | 0.6 | 99.2 | 96.4 |
| 5 | Hyonics JN 400 | | 99.7 | 97.9 | 0.3 | 0.4 | 39.0 | 1.8 | 61.0 | 3.7 | 0.5 | 0.3 | 99.5 | 95.9 |

EXAMPLES 6–7

The Separation of Boric Acid from Anhydrous Sodium Sulfate by Flotation: Boric Acid Produced By Reacting A Boron Ore With Sulfuric Acid Kernite ore was employed in the tests. Kernite, which has the formula $Na_2B_4O_7 \cdot 4H_2O$, is very difficult to dissolve in water and, therefore, cannot be refined as easily by solution-crystallization as borax having five and ten moles of water of crystallization. Generally, the kernite ore consists of mixtures of kernite with borax decahydrate and contains between about 5 to 50% of water-insolubles.

EXAMPLE 6

The starting material was kernite ore containing 16.5% water-insolubles and 38.4% $B_2O_3$. A $H_3BO_3$-

Na$_2$SO$_4$ equilibrium brine (2390 grams) was heated to 80°C. and then 2.5 pounds per ton of feed of Tamol 850 (crystal modifier) was added. Kernite (355 grams; 3 mesh) and concentrated sulfuric acid (99 grams) were added and reacted at a pH of 4.8 at 80°C. The pH was maintained by varying the respective feed rates; it took 15 minutes to feed the kernite ore, and 10 minutes more to feed the remaining sulfuric acid to drop the pH to 3.3 at 80°C. After passing over a 28 mesh screen to eliminate the coarse gangue, the resultant slurry was then allowed to cool to 38°C. (about 3 hours during which the pH rose to 4.5). Care was taken to cover the beaker during the reaction and cooling periods to avoid excessive evaporation.

The cooled slurry was transferred to the flotation cell and Gaftex 328 (anionic silicone emulsion) was added at a level of 0.4 pound per ton of feed as a froth modifier prior to the flotation. During the flotation of 3 minutes duration, equilibrium brine was added at 38°C. to maintain slurry level in the cell. Flocculant, such as a guar gum, was added to the tailings' slurry. After 10 minutes' settling, most of the brine was decanted and the solids were filtered. The mother liquors were reused to slurry the rougher concentrate. Another 0.1 pound of Gaftex 328 was added and the slurry was submitted to a cleaner flotation. The cleaner tailings were treated as above, and the cleaner concentrate was reslurried with the mother liquor for a recleaner flotation without further addition of reagent. The recleaner tails were flocculated with 2.0 milliliter of a 0.05% guar solution, settled, decanted and filtered. The recleaner concentrate was centrifuged. All products were analyzed wet for boric acid and sodium sulfate, and the results were brine-corrected as described above. The results are given in Table II.

EXAMPLE 7

The procedure followed was the same as Example 6 described above except that no crystal modifier (Tamol 850) was used during the reaction of kernite ore with sulfuric acid. The results are given in Table II.

TABLE II

| Example | Product | Wt. % | H$_3$BO$_3$ % Grade | H$_3$BO$_3$ % Distr. | Water Insolubles % Grade | Water Insolubles % Distr. | Na$_2$SO$_4$ % Grade | Na$_2$SO$_4$ % Distr. |
|---|---|---|---|---|---|---|---|---|
| 6 | Rcl. Conc. | 49.9 | 98.2 | 95.7 | 0.2 | 1.0 | 1.6 | 2.1 |
|   | Cl. Tails | 3.8 | 30.7 | 2.3 | 21.4 | 7.2 | 47.9 | 4.9 |
|   | Rcl. Tails | 1.1 | 48.0 | 1.0 | 27.6 | 2.7 | 24.3 | 0.7 |
|   | R. Tails | 45.2 | 1.1 | 1.0 | 22.3 | 89.1 | 76.7 | 92.3 |
| 7 | RCl. Conc. |  | 87.4 |  | 0.5 |  | 12.1 |  |

EXAMPLE 8

The starting material was kernite ore containing 30% water insolubles and 29.6% B$_2$O$_3$. The procedure followed was the same as described in Example 6, except the sulfuric acid was added to the slurry all at once after the initial reaction at pH 4.5. After five minutes of additional stirring to assure a complete reaction, the slurry was passed over the 28 mesh screen to separate the coarse gangue prior to cooling. A hydrophobic silica antifoaming agent was used to control the froth in an amount of 0.015 lbs. per ton of feed. The results were as follows:

TABLE III

| Product | Wt.% | H$_3$BO$_3$ %Grade | H$_3$BO$_3$ %Distr. | Water Insolubles %Grade | Water Insolubles %Distr. | Na$_2$SO$_4$ %Grade | Na$_2$SO$_4$ %Distr. |
|---|---|---|---|---|---|---|---|
| Concentrate | 44.4 | 99.1 | 94.5 | 0.2 | 0.3 | 0.7 | 1.2 |
| Cleaner Tails | 1.5 | 28.7 | 0.9 | 37.0 | 2.0 | 34.3 | 2.1 |
| Re-Cleaner Tails | 1.5 | 87.0 | 2.8 | 9.6 | 0.5 | 3.4 | 0.2 |
| Rougher Tails | 28.1 | 3.0 | 1.8 | 10.8 | 10.7 | 86.2 | 96.5 |
| +28 mesh H$_2$O insoluble | 24.5 | — | — | 100.0 | 86.5 | — | — |

EXAMPLE 9

This test followed the same procedure described in Example 8. However, the reaction was carried out at 70°C. The results were as follows:

TABLE IV

| Product | Wt.% | H$_3$BO$_3$ %Grade | H$_3$BO$_3$ %Distr. | Water Insolubles %Grade | Water Insolubles %Distr. | Na$_2$SO$_4$ %Grade | Na$_2$SO$_4$ %Distr. |
|---|---|---|---|---|---|---|---|
| Concentrate | 41.2 | 99.1 | 96.6 | 0.2 | 0.3 | 0.7 | 1.1 |
| Cleaner Tails | 1.1 | 35.4 | 0.9 | 51.0 | 1.8 | 13.6 | 0.6 |
| Re-Cleaner Tails | 0.6 | 57.7 | 0.8 | 36.7 | 0.7 | 5.6 | 0.1 |
| Rougher Tails | 31.5 | 2.2 | 1.7 | 14.6 | 14.8 | 83.2 | 98.2 |
| +28 mesh H$_2$O insoluble | 25.6 | — | — | 100.0 | 82.4 | — | — |

EXAMPLES 10–12

Flotation of Boric Acid from "Glauber's Salt Slurries"

This represents a special case in which the bulk of the boric acid had been filtered previously at a temperature above the transition point (29.2°C.) and in which the mother liquors are subsequently cooled below the transition point for a crop of Glauber's salt.

According to the phase equilibrium, some boric acid crystallizes simultaneously and can be recovered by flotation. In this case, only the froth modifiers are needed. Tergitol 15-S-3A (a sulfated polyethyleneglycol ether of linear alcohol) was used in the test. However, other compounds of a similar composition, for example, Hyonics JN 400, Sulfatex SAT, and other compounds previously described as a froth modifier, can be used.

The flotation procedure employed was the same as in the above examples. The results were as follows:

TABLE V

Flotation of Boric Acid from "Glauber's Salt Slurries"

| EXAMPLE | REAGENTS | | | | ROUGHER CONCENTRATE | | | ROUGHER TAILINGS | | | Froth CHARACTERISTICS |
|---|---|---|---|---|---|---|---|---|---|---|---|
| | Frother | | Second Surfactant | | Boric Acid | | Glauber's Salt | Boric Acid | | Glauber's Salt | |
| | Kind | lb./ton | Kind | lb./ton | Grade % | Distr. % | Grade % | Grade | Distr. % | Grade % | |
| 10 | none | | none | | 68.8 | 93.7 | 31.2 | 0.9 % | 6.3 | 99.1 | too voluminous |
| 11 | Dow-froth 250 | 0.06 | none | | 99.3 | 93.0 | 7.0 | 1.0 | 7.0 | 99.0 | improved |
| 12 | Dow-froth 250 | 0.06 | Tergitol 15-S-3A | 1 | 100.0 | 92.0 | 0 | 0.5 | 8.0 | 99.5 | good |

10 Slurry contained 21.0% solids (12.2% boric acid and 87.8% Glauber's salt)
11 Slurry contained 26.5% solids (13.1% boric acid and 86.9% Glauber's salt)
12 Slurry contained 22.7% solids (6.5% boric acid and 93.5% Glauber's salt)

Thus, it is seen that an excellent separation of boric acid from the contaminated brine is achieved by the method of this invention.

Various changes and modifications of the invention can be made, and to the extent that such variations incorporate the spirit of this invention, they are intended to be included within the scope of the appended claims.

What is claimed is:

1. A method for isolating clean crystalline boric acid from a slurry, obtained by reaction between a borate ore and sulfuric acid and seriously contaminated with clay slimes and sodium sulfate, which comprises the steps of adding a crystal modifier to the slurry, stirring said slurry to which the crystal modifier has been added at a temperature from about 55°C. to about 100°C., cooling said slurry to a temperature near Glauber's salt transition temperature, adding a froth modifier to said slurry cooled to a temperature near Glauber's salt transition temperature, subjecting said cooled slurry to a froth flotation manipulation, and separating the tailings of the froth flotation manipulation from floated materials consisting essentially of clean crystalline boric acid.

2. The method of claim 1, wherein the temperature near Glauber's salt transition temperature is between about 35°C. and about 40°C.

3. The method of claim 1, wherein the temperature near Glauber's salt transition temperature is between about 20°C. and about 25°C.

4. The method of claim 1, wherein said crystal modifier is added in an amount between about 0.1 and about 5.0 pounds per ton of said borate ore.

5. The method of claim 1, wherein said froth modifier is added in an amount between about 0.01 and about 2.0 pounds per ton of said borate ore.

6. The method of claim 1, wherein said crystal modifier is selected from the group consisting of sulfated polyethyleneoxy ethers of linear aliphatic alcohols, sodium hydrocarbon sulfonates, polynaphthalene sulfonic acids and salts of polymeric carboxylic acids, and is added in an amount between about 0.25 and about 2.5 pounds per ton of said borate ore.

7. The method of claim 1, wherein said froth modifier is an anionic silicone and is present in an amount between about 0.02 and about 0.75 pound per ton of said borate ore.

8. The method of claim 1, wherein the borate ore is kernite.

9. The method of claim 1, wherein the borate ore is kernite, the temperature near Glauber's salt transition temperature is between about 30°C. and about 40°C., the crystal modifier is a salt of a polymeric carboxylic acid and the froth modifier is an anionic silicone.

10. The method of claim 1, wherein the borate ore is kernite, the temperature near Glauber's salt transition temperature is between about 35° and about 40°C., the crystal modifier is a salt of a polymeric carboxylic acid and the froth modifier is an anionic silicone.

11. The method of claim 1, wherein said froth modifier is an anionic silicone and is present in an amount between about 0.02 and about 0.75 pound per ton of said borate ore and a frother is present in an amount between about 0.01 and about 0.03 pound per ton of said borate ore.

12. A method for isolating clean crystalline boric acid from a slurry thereof contaminated with sodium sulfate, which comprises the steps of cooling the slurry to a temperature above Glauber's salt transition temperature, adding to said slurry cooled to a temperature above Glauber's salt transition temperature a crystal modifier and a froth modifier, subjecting said slurry to which the crystal modifier and the froth modifier have been added to a froth flotation manipulation, and separating the tailings of the froth flotation manipulation from floated materials consisting essentially of clean crystalline boric acid.

13. The method of claim 12, wherein the temperature near Glauber's salt transition temperature is between about 35°C. and about 40°C.

14. The method of claim 12, wherein said crystal modifier is added in an amount between about 0.1 and about 5.0 pounds per ton of said boric acid in said slurry.

15. The method of claim 12, wherein said froth modifier is added in an amount between about 0.01 and about 2.0 pounds per ton of boric acid in said slurry.

16. The method of claim 12, wherein said crystal modifier is selected from the group consisting of sulfated polyethyleneoxy ethers of linear aliphatic alcohols, sodium hydrocarbon sulfonates, polynaphthalene sulfonic acids, polymeric aliphatic carboxylic acids and is added in an amount between about 0.25 and about 2.5 pounds per ton of boric acid in said slurry.

17. The method of claim 12, wherein said froth modifier is selected from the group consisting of sulfated polyethyleneoxy ethers of linear aliphatic alcohols and aliphatic acid phosphate esters and anionic silicones and is present in an amount between about 0.02 and about 0.75 pound per ton of boric acid in said slurry.

18. The method of claim 12, wherein said slurry is the product of reaction between a borate ore and sulfuric acid and the temperature near Glauber's salt transition temperature is between about 35°C. and about 40°C.

19. The method of claim 12, wherein said slurry is the product of reaction between kernite and sulfuric acid.

20. The method of claim 12, wherein said slurry contains from about 10% by weight to about 40% by weight of solids.

21. The method of claim 12, wherein said crystal modifier and said froth modifier are sulfated polyethyleneoxy ethers of linear aliphatic alcohols.

* * * * *

UNITED STATES PATENT OFFICE
CERTIFICATE OF CORRECTION

PATENT NO. : 3,917,801
DATED : November 4, 1975
INVENTOR(S) : Martin Wilson

It is certified that error appears in the above-identified patent and that said Letters Patent are hereby corrected as shown below:

In Column 2, line 50 delete "agregates" and add

--aggregates--;

In Column 4, line 46 after "into" add --long--

In Column 4, line 48 delete "into long" and add --the--

Signed and Sealed this twenty-third Day of March 1976

[SEAL]

Attest:

RUTH C. MASON
*Attesting Officer*

C. MARSHALL DANN
*Commissioner of Patents and Trademarks*